United States Patent
Schultz et al.

(10) Patent No.: US 9,104,270 B2
(45) Date of Patent: Aug. 11, 2015

(54) VIDEO SYSTEM HAVING A TOUCH SCREEN

(75) Inventors: Mark Alan Schultz, Carmel, IN (US); James Donald Gootee, Indianapolis, IN (US); Gregory William Cook, Lafayette, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1106 days.

(21) Appl. No.: 12/227,496

(22) PCT Filed: May 22, 2006

(86) PCT No.: PCT/US2006/019689
§ 371 (c)(1),
(2), (4) Date: Nov. 19, 2008

(87) PCT Pub. No.: WO2007/136372
PCT Pub. Date: Nov. 29, 2007

(65) Prior Publication Data
US 2009/0153501 A1 Jun. 18, 2009

(51) Int. Cl.
*G09G 5/00* (2006.01)
*G06F 3/042* (2006.01)
*H04N 9/31* (2006.01)

(52) U.S. Cl.
CPC ............ *G06F 3/0425* (2013.01); *H04N 9/3147* (2013.01)

(58) Field of Classification Search
CPC ... G09G 3/0488; G09G 3/044; G09G 3/0425; G09G 3/011; G09G 3/017; G03B 21/26; G03B 21/56
USPC .................... 345/156–158, 173–179, 1, 2; 178/18.01–18.09
See application file for complete search history.

(56) References Cited

U.S. PATENT DOCUMENTS

| | | | |
|---|---|---|---|
| 4,891,508 A | 1/1990 | Campbell | |
| 6,008,484 A | 12/1999 | Woodgate et al. | |
| 6,061,177 A * | 5/2000 | Fujimoto | 359/443 |
| 6,283,860 B1 * | 9/2001 | Lyons et al. | 463/36 |
| 7,084,859 B1 * | 8/2006 | Pryor | 345/173 |
| 7,170,492 B2 * | 1/2007 | Bell | 345/158 |

(Continued)

FOREIGN PATENT DOCUMENTS

| | | |
|---|---|---|
| DE | 8915218 | 2/1990 |
| GB | 2377607 | 1/2003 |

(Continued)

OTHER PUBLICATIONS

International Search Report, dated Feb. 21. 2007.
Ames et al., "Development of a miniaturized system for monitoring vergence during viewing of stereoscopic imagery using a head mounted display," Proceedings of the SPIE, vol. 5291, No. 1, pp. 25-35, 2004.

*Primary Examiner* — Jennifer Nguyen
(74) *Attorney, Agent, or Firm* — Robert D. Shedd; Reitseng Lin

(57) ABSTRACT

A video system such as a television signal receiver includes a touch screen that may be suitable for larger image screens. According to an exemplary embodiment, the video system includes a screen having first and second sides, wherein a depression of the screen on the first side produces an image detectable on the second side. At least one projector is disposed on the second side of the screen and projects a first video signal onto the screen. At least one camera is disposed on the second side of the screen and detects the image. A processor determines a location of the depression according to the detected image.

29 Claims, 3 Drawing Sheets

(56) References Cited

U.S. PATENT DOCUMENTS

| | | | |
|---|---|---|---|
| 7,355,593 B2 * | 4/2008 | Hill et al. | 345/173 |
| 7,710,391 B2 * | 5/2010 | Bell et al. | 345/156 |
| RE41,731 E * | 9/2010 | Dietz et al. | 343/893 |
| 2002/0093666 A1 | 7/2002 | Foote et al. | |
| 2003/0157464 A1 | 8/2003 | Tanassi et al. | |
| 2003/0231219 A1 | 12/2003 | Leung | |
| 2003/0234346 A1 * | 12/2003 | Kao | 250/221 |
| 2003/0234364 A1 * | 12/2003 | Hennessy et al. | 250/370.14 |
| 2005/0168448 A1 | 8/2005 | Simpson | |
| 2006/0125799 A1 * | 6/2006 | Hillis et al. | 345/173 |

FOREIGN PATENT DOCUMENTS

| | | |
|---|---|---|
| JP | 05160702 | 6/1993 |
| JP | 2004071233 | 3/2004 |
| KR | 173010 | 3/1999 |
| KR | 2004031195 | 4/2004 |
| WO | WO92/02008 | 2/1992 |
| WO | WO02061491 | 8/2002 |

\* cited by examiner

VIDEO SYSTEM HAVING A TOUCH SCREEN

This application claims the benefit, under 35 U.S.C. §365 of International Application PCT/US2006/019689, filed May 22, 2006, which was published in accordance with PCT Article 21(2) on Nov. 29, 2007 in English.

BACKGROUND OF THE INVENTION

1. Field of the Invention

The present invention generally relates to video systems such as television signal receivers, and more particularly, to a video system having a touch screen that may be suitable for larger image screens.

2. Background Information

Video systems such as television signal receivers are being produced with relatively large image screens. For example, certain video systems may include image screens that are ten or more feet wide. To fit these larger image screens into buildings requires either large building openings, or the image screen must be flexible. Such flexible image screens may for example be snapped or laced to a screen frame inside the building.

Larger image screens may present special problems when interacting with users. While the concept of touch control for such image screens may be desirable, conventional touch screen technologies may be unsuitable for larger image screens. For example, certain conventional touch screens may use light emitting diode (LED) arrays or capacitive pickups to track the location of points that are either blocking light or changing the electrical characteristics of an x-y coordinate plane. Such conventional touch screen technologies may be problematic for larger image screens since capacitive touch screens generally do not scale well with larger size screens, and LED arrays have problems with flexible screen movements which may cause false triggers. For example, if an LED array is set away from the screen by a certain distance (e.g., 6", etc.), false triggers can occur from users simply looking closely at the screen, and without touching it.

Accordingly, there is a need for a touch screen for video systems that addresses the foregoing problems, and is thereby suitable for larger image screens. The present invention addresses these and/or other issues.

SUMMARY OF THE INVENTION

In accordance with an aspect of the present invention, a video system is disclosed. According to an exemplary embodiment, the video system comprises a screen having first and second sides, wherein a depression of the screen on the first side produces an image detectable on the second side. A projector is disposed on the second side of the screen and projects a first video signal onto the screen. A detector, such as a camera, detects the image. A processor is coupled to the projector and the detector and determines a location of the depression according to the detected image.

In accordance with another aspect of the present invention, a method for operating a video system is disclosed. According to an exemplary embodiment, the method comprises steps of providing a screen having first and second sides wherein a depression of the screen on the first side produces an image detectable on the second side, projecting a first video signal onto the second side of the screen, detecting the image on the second side of the screen, and determining a location of the depression according to the detected image.

In accordance with another aspect of the present invention, a television signal receiver is disclosed. According to an exemplary embodiment, the television signal receiver comprises a screen having first and second sides, wherein a depression of the screen on the first side produces an image detectable on the second side. Video projecting means is disposed on the second side of the screen and projects a first video signal onto the screen. Detecting means detects the image. Processing means determines a location of the depression according to the detected image.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
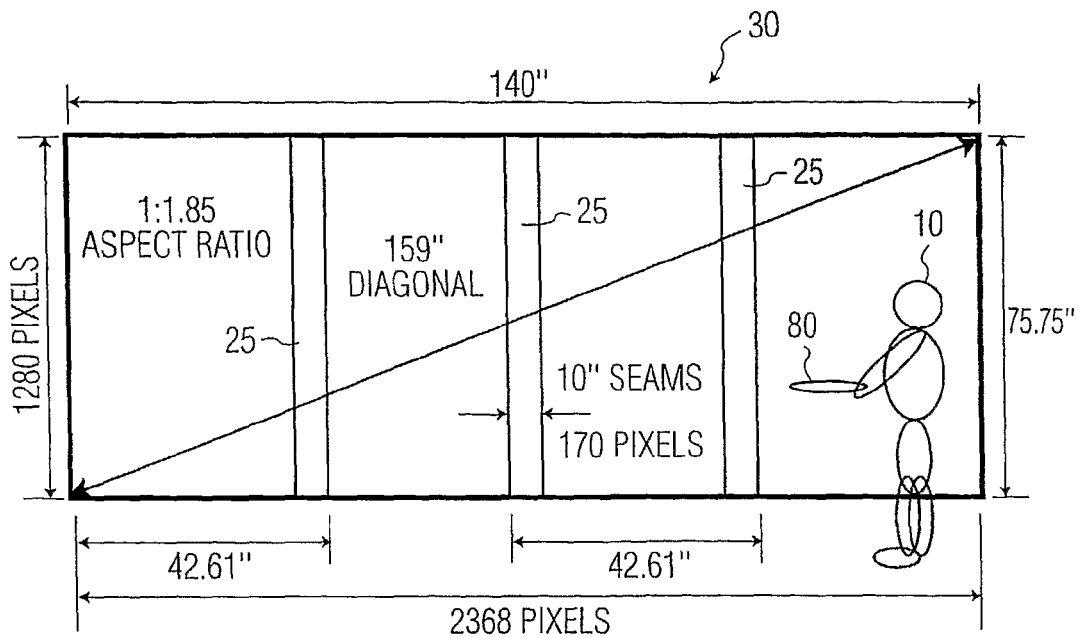
FIG. 1 is a front view of a touch screen according to an exemplary embodiment of the present invention.

Referring now to the drawings, and more particularly to FIG. 1, a front view of a touch screen 30 according to an exemplary embodiment of the present invention is shown. Touch screen 30 of FIG. 1 is operative to display still and/or video images and to receive tactile inputs from one or more users such as user 10. Touch screen 30 may be constructed from any suitable material. According to an exemplary embodiment, touch screen 30 may be constructed from a flexible material (e.g., plastic, etc.) that may be depressed inwardly one-half inch or more. As indicated in FIG. 1, touch screen 30 includes a plurality of seams 25. As will be described later herein, such seams 25 may represent regions of touch screen 30 that receive video signals from more than one video source, and/or may also represent overlapping detection regions for detecting user inputs to touch screen 30. Although FIG. 1 shows three seams 25 for purposes of example and explanation, the actual number of such seams 25 employed in practice may be different as a matter of design choice. Also for purposes of example and explanation, touch screen 30 is shown in FIG. 1 as having certain specific dimensions and attributes such as an aspect ratio of approximately 1:1.85. Such dimensions and attributes shown in any FIGS. are exemplary only, and the inventive principles described herein may be applied to touch screens having different dimensions and/or attributes.

Figure 2:
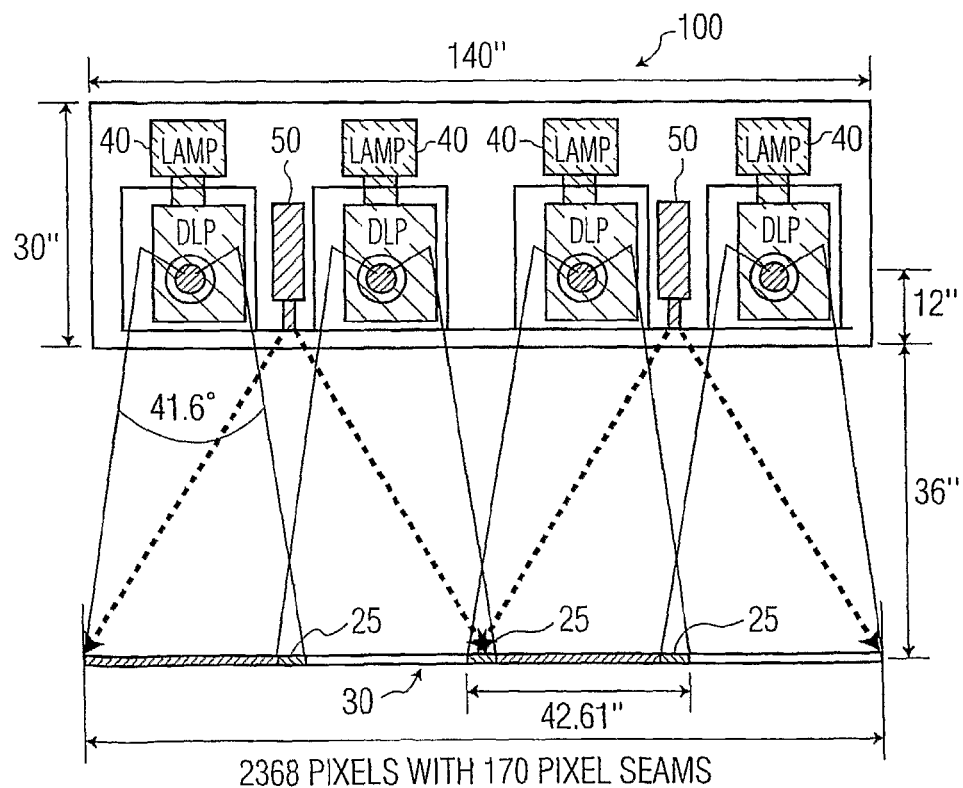
FIG. 2 is a top view of an exemplary video system including the touch screen of FIG. 1.
Figure 3:
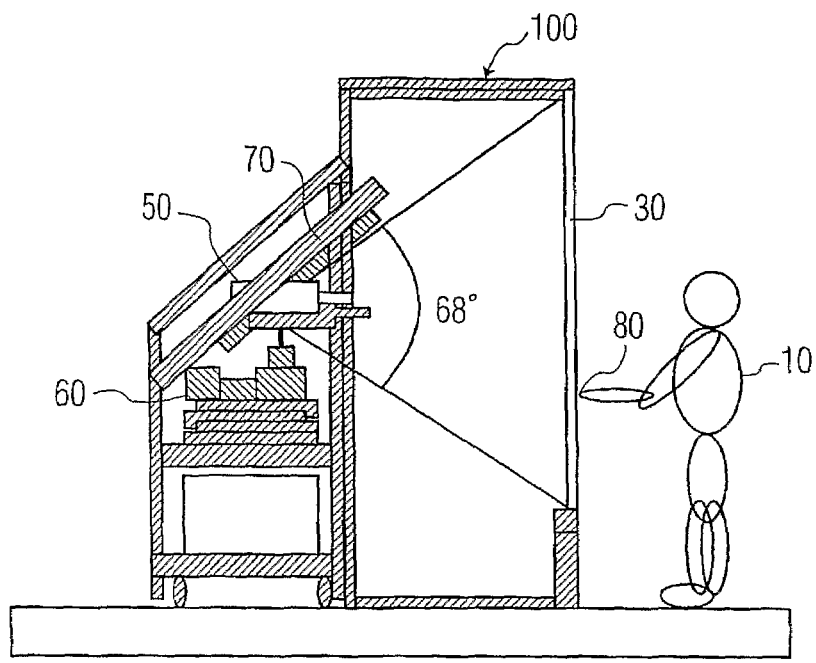
FIG. 3 is a side view of an exemplary video system including the touch screen of FIG. 1.
Figure 4:
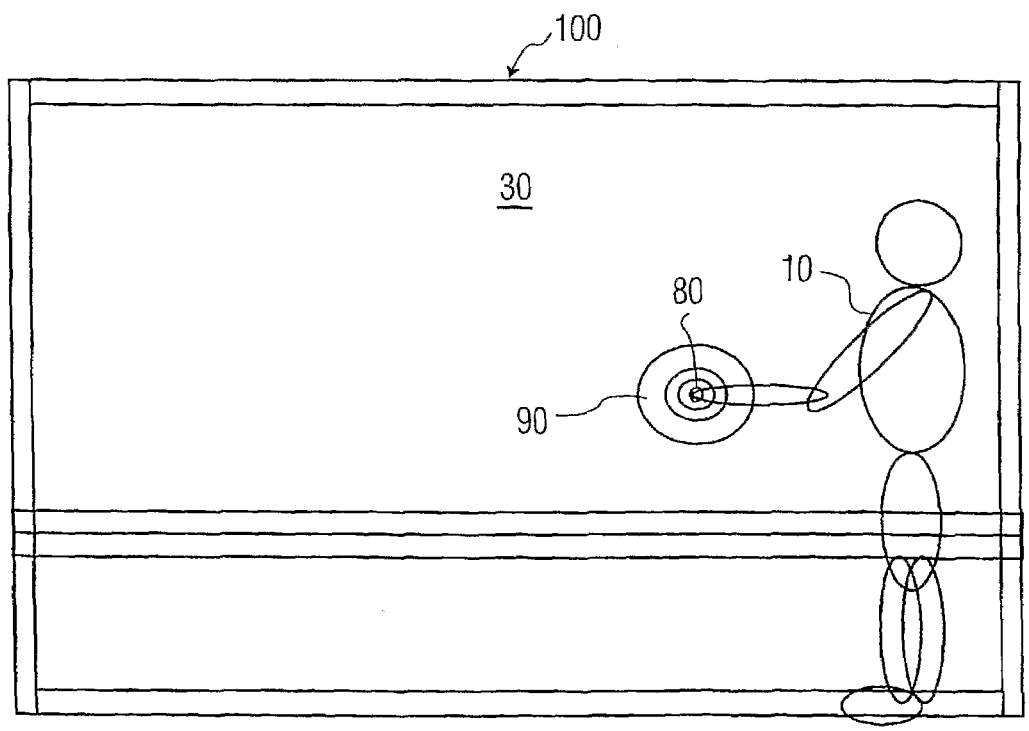
FIG. 4 is a front view of an exemplary video system including the touch screen of FIG. 1.

Referring to FIGS. 2 to 4, various views of an exemplary video system 100 including touch screen 30 of FIG. 1 are shown. As indicated in FIGS. 2 to 4, video system 100 further includes video projecting means such as projectors 40, detecting means such as infrared (IR) cameras 50, processing means such as processor 60, and supporting means such as mirror holders 70. According to an exemplary embodiment, video system 100 is embodied as a projection television signal receiver, but may be embodied as any type of video system and/or image-display device.

Projectors 40 are each operative to project signals including still and/or video images onto touch screen 30. According to an exemplary embodiment, each projector 40 includes a lamp and a digital light processing (DLP) unit, and is associated with a tuning device (not shown in FIGS.). Although FIG. 2 shows four projectors 40 for purposes of example and explanation, the actual number of such projectors 40 employed in practice may be different as a matter of design choice. When multiple projectors 40 are employed, as shown in FIG. 2, the edges of images projected by adjacent projectors 40 may overlap and be blended in seams 25 of touch screen 30.

IR cameras 50 are each operative to detect user inputs to touch screen 30. According to an exemplary embodiment, a user input (e.g., depression) at a location 80 on one side of touch screen 30 produces an IR image 90 (see FIG. 4) on the other side of touch screen 30 that is detectable by IR cameras 50. The depression causes an area of the touch screen 30 sunk below its surroundings and the image 90 is formed in that sunken area. IR cameras 50 may operate at a lower resolution than the resolution of the displays provided on touch screen 30. Although not expressly shown in the FIGS., each IR camera 50 may for example include a filter that filters normal video content from IR content. Illuminating the entire area of touch screen 30 with IR can also improve the sensitivity of input detection by IR cameras 50. This would not be visible to users but provides dedicated radiation that may enhance touch sensitivity. Although FIG. 2 shows two IR cameras 50 for purposes of example and explanation, the actual number of such IR cameras 50 employed in practice may be different as a matter of design choice. Although FIG. 2 depicts IR cameras 50 as having non-overlapping detection regions on touch screen 30, an alternative embodiment of the present invention includes IR cameras 50 having overlapping detection regions such that multiple IR cameras 50 may each detect user inputs to touch screen 30. Further exemplary details regarding IR cameras 50 having such overlapping detection regions will be provided later herein.

Processor 60 is operative to perform various processing functions, and may include one or more associated memories for storing data that enables the operation of video system 100. According to an exemplary embodiment, processor 60 is coupled to projectors 40 and IR cameras 50, and is operative to determine locations (e.g., location 80) of user inputs (e.g., depressions) to touch screen 30 and the areas of IR images (e.g., image 90) produced from such inputs.

When determining the locations of user inputs to touch screen 30, processor 60 may take the user's arm length into consideration. According to an exemplary embodiment, processor 60 may receive data defining the contour of a user (e.g., user 10) on the front side of touch screen 30 from one or more thermal sensors or shadow processors (not shown in FIGS.). Processor 60 may then use this contour data to determine the user's location, size and arm length. For example, processor 60 may determine the user's location and size from the contour data and examine data in one of its associated memories that correlates user size to arm length. Processor 60 may then determine that the location of the user input exists within a range reachable by the user's arm, thereby reducing processing time.

Processor 60 is further operative to determine the time periods in which IR images are produced from user inputs to touch screen 30. Processor 60 may use these time periods and the areas of the IR images to determine the accelerations of the user inputs. Location, area and acceleration data may be used for purposes such as recognizing the input of predetermined characters and/or commands to touch screen 30. Further exemplary details regarding the operation of processor 60 will be provided later herein.

Mirror holders 70 are operative to hold and support mirrors included in the DLP units of projectors 40. According to an exemplary embodiment, mirror holders 70 are mounted within the interior of a frame of video system 100 (see FIG. 3), and position associated mirrors at 45 degree angles, although different angular orientations may be used based on design choice.

Figure 5:
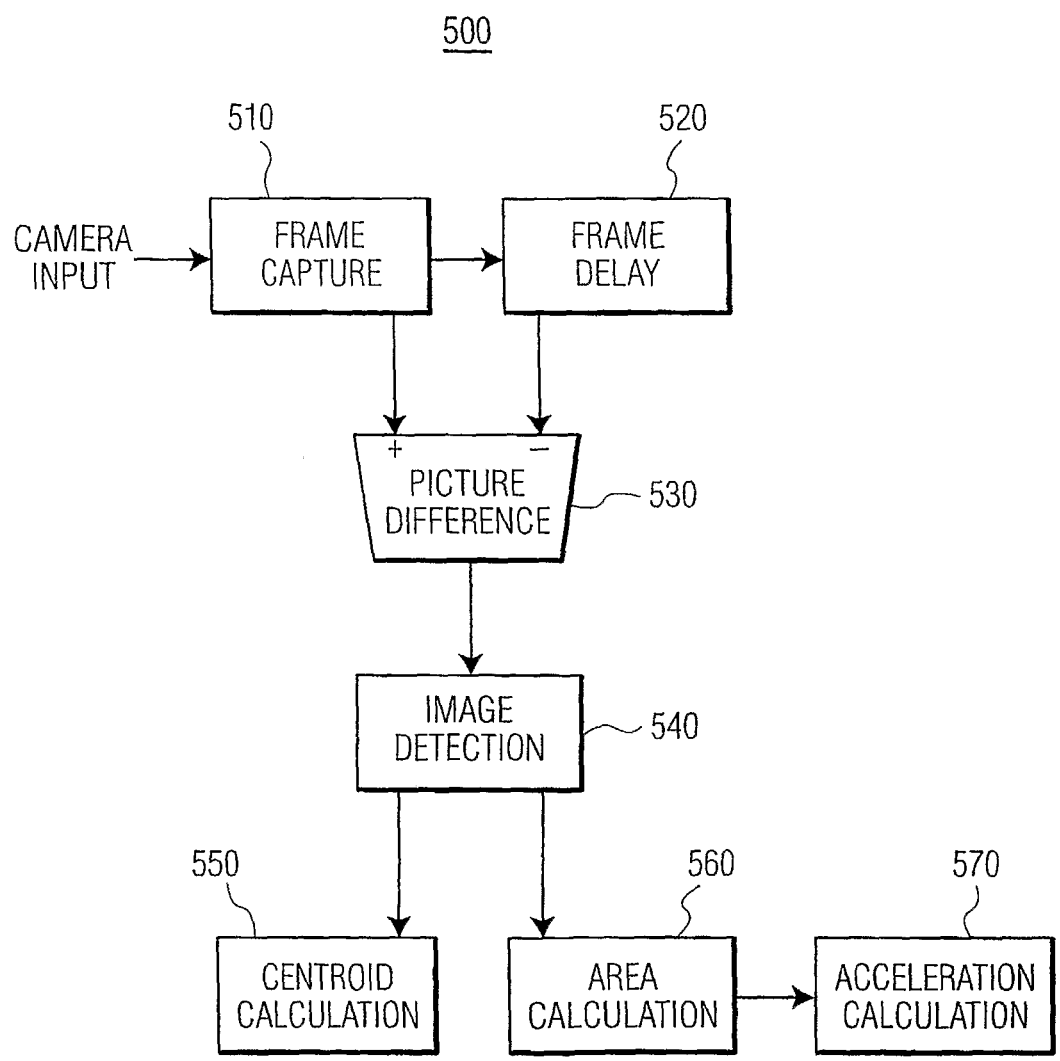
FIG. 5 is a flowchart illustrating steps for processing user inputs to a touch screen according to an exemplary embodiment of the present invention.

Referring to FIG. 5, a flowchart 500 illustrating steps for processing user inputs to a touch screen according to an exemplary embodiment of the present invention is shown. For purposes of example and explanation, the steps of FIG. 5 will be described with reference to touch screen 30 and video system 100 previously described herein. The steps of FIG. 5 are merely exemplary, and are not intended to limit the present invention in any manner.

At step 510, a frame capture process is performed. According to an exemplary embodiment, an input video frame from one or more IR cameras 50 is captured at step 510. At step 520, the captured frame is delayed by a predetermined time period (e.g., the duration of one frame, etc.) to produce a delayed video frame. At step 530, the delayed video frame is subtracted from another captured video frame to produce an IR frame that includes an IR image produced as a result of a user input (e.g., depression) to touch screen 30. According to an exemplary embodiment, the IR frame includes IR image 90 that is produced as a result of a user input (e.g., depression) to touch screen 30 at location 80 (see FIGS. 1, 3 and 4). Steps 510 to 530 may be performed by and/or under the control of processor 60, or another element (not shown in FIGS.) of video system 100. It is also noted that a single frame for processing could be obtained at step 510, and steps 520 and 530 omitted. The processes described below may then be performed on this single frame. This technique may simplify the processing requirements of video system 100.

At step 540, an image detection process is performed. According to an is exemplary embodiment, one or more IR cameras 50 detect IR image 90 at step 540 from the IR frame produced from step 530. As previously indicated, the IR frame may include IR image 90 that is produced as a result of a user input (e.g., depression) to touch screen 30 at location 80 (see FIGS. 1, 3 and 4). The one or more IR cameras 50 send data representative of the detected IR image 90 to processor 60.

At step 550, a centroid calculation process is performed. According to an exemplary embodiment, processor 60 calculates the centroid of IR image 90 detected at step 540 to thereby determine location 80 of the user input to touch screen 30 (see FIGS. 1, 3 and 4). That is, the centroid of IR image 90 is deemed to represent the point of depression (i.e., location 80) of the user-input to touch screen 30. Processor 60 may calculate the centroid of IR image 90 at step 550 using any suitable calculation method such as the Hough transform method, the Centroid method and/or the Correlation method which are all generally known in the art. Also, to reduce the processing time required to calculate the centroid of IR image 90, the arm length of the user may be taken into consideration. According to an exemplary embodiment, processor 60 may receive data defining the contour of a user (e.g., user 10) on the front side of touch screen 30 from one or more thermal sensors or shadow processors (not shown in FIGS.). Processor 60 may then use this contour data to determine the user's location, size and arm length. For example, processor 60 may determine the user's location and size from the contour data and examine data in one, of its associated memories that correlates user size to arm length. Processor 60 may then calculate the centroid of IR image 90 by determining that the centroid exists within a range reachable by the user's arm, thereby reducing processing time.

As previously indicated herein, processor 60 receives data representative of the detected IR image 90 from one or more IR cameras 50 to enable the centroid calculation at step 550. When processor 60 receives such data from multiple IR cameras 50, such IR cameras 50 may have overlapping detection regions. These overlapping detection regions are regions of touch screen 30 in which user inputs can be detected by more than one IR camera 50. Seams 25 (see FIGS. 1 and 2) may for example represent such overlapping detection regions. When user inputs to touch screen 30 occur within an overlapping detection region, processor 60 can calculate the centroid of IR image 90 at step 550 using at least two different techniques. According to the first technique, processor 60 maps the data provided via the multiple IR cameras 50 to a central coordinate system of touch screen 30 (i.e., a coordinate system based on the dimensions of the entire area of touch screen 30 and not just a sub-portion thereof), and then calculates the centroid from the central coordinate system at step 550. According to a second technique, processor 60 uses data provided via only one of the IR cameras 50 to calculate the centroid at step 550. With this second technique, processor 60 determines which one of the multiple IR cameras 50 has a center detection region closest to the location 80 of the user input, and uses the data provided from this closest IR camera 50 while ignoring the data provided from the other IR camera(s) 50. When multiple IR cameras 50 provide data to processor 60, processor 60 maps the coordinates of each IR camera's 50 detection region to the central coordinate system of touch screen 30. In this manner, processor 60 is able to determine which IR camera 50 has a center detection region closest to the location 80 of a user input.

At step 560, an area calculation process is performed. According to an exemplary embodiment, processor 60 calculates the area of IR image 90 detected at step 540. Processor 60 may calculate the area of IR image 90 at step 560 using any suitable calculation method such as the aforementioned Hough transform method, the Centroid method and/or the Correlation method. The area of IR image 90 indicates the inward depth of the user input to touch screen 30. A relatively large area indicates that touch screen 30 has been displaced inwardly by a relatively large amount, while a relatively small area indicates that touch screen 30 has been displaced inwardly by a relatively small amount. Accordingly, the potential range of areas that may be calculated at step 560 depends on the flexibility of the material used for touch screen 30. Also, different users may apply different amounts of pressure when making inputs to touch screen 30. Therefore, the area calculated at step 560 may be used as a basis to distinguish between inputs from different users. For example, areas within a first range of values could be attributed to a first user, areas within a second range of values could be attributed to a second user, and so on. Of course, the users would have to "train" video system 100 beforehand by programming their respective inputs into memory.

At step 570, an acceleration calculation process is performed. According to an exemplary embodiment, processor 60 determines a time period in which IR image 90 is produced and uses this time period and the area calculated at step 560 to thereby determine an acceleration of the user input at step 570. That is, the acceleration of the user input represents the rate of change of input depth (as indicated by the area) versus time. Location, area and acceleration data may be used for purposes such as recognizing the input of predetermined characters and/or commands to touch screen 30.

User inputs to touch screen 30, as described above, may enable users to control video system 100, such as, by selecting items displayed on touch screen 30. For example, user 10 may select certain video content by selecting a specific item displayed on touch screen 30. According to this example, one or more projectors 40 may project onto touch screen 30 a video signal including a plurality of user selectable items (e.g., icons, etc.) in which each item is linked to a different audio and/or video signal. Each item may for example represent a different television broadcast channel. User 10 may then provide an input to touch screen 30 by depressing touch screen 30 at location 80 which corresponds to the location of a desired one of the items. Processor 60 identifies the desired item responsive to the input, and in turn controls a tuning device (not shown in FIGS.) of video system 100 which causes the one or more projectors 40 to project onto touch screen 30 a specific video signal linked to the desired item. The present invention could also be used for other purposes, such as a security feature for detecting unauthorized tampering with touch screen 30.

As described herein, the present invention provides a video system having a touch screen that may be suitable for larger image screens. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A video system, comprising:
    a screen having a front side and a back side, wherein a depression of said screen on said front side produces an image detectable on said back side;
    a projector, disposed on said back side of said screen, for projecting a first video signal onto said back side of said screen;
    a detector on said back side of said screen for detecting said image; and
    a processor, coupled to said projector and said detector, for determining a location of said depression according to said detected image on said back side of said screen, wherein said processor receives data defining a contour of a user on said front side of said screen, determines an arm length of said user based on said contour and determines that said location exists within a range reachable by said arm length.

2. The video system of claim 1, wherein said first video signal includes a plurality of items, and said processor identifies one of said items displayed at said location.

3. The video system of claim 2, wherein each said item is linked to a different video signal, and said processor causes said projector to display a second video signal linked to said identified item.

4. The video system of claim 1, wherein said processor further determines a time period of said depression, determines an area of said detected image, and uses said determined time period and said determined area to determine an acceleration of said depression.

5. The video system of claim 1, wherein said processor determines that said location is a centroid of said detected image.

6. The video system of claim 1, wherein said detector comprises at least one camera disposed on the back side of said screen.

7. The video system of claim 6, wherein:
said detector comprises a plurality of cameras having an overlapping detection region on said screen;
said depression occurs within said overlapping detection region; and
said processor maps data provided via said cameras to a central coordinate system of said screen to determine said location.

8. The video system of claim 6, wherein:
said detector comprises first and second cameras having an overlapping detection region on said screen;
said depression occurs within said overlapping detection region; and
said processor determines said location using data provided via said first camera and not using data provided via said second camera.

9. The video system of claim 8, wherein a center detection region of said first camera is closer to said location than a center detection region of said second camera.

10. The video system of claim 1, wherein said detector emits infrared light to illuminate said screen, detects infrared content of said screen, and detects said image by filtering out video content of said first video signal.

11. A method for operating a video system, comprising steps of:
providing a screen having a front side and a back side, wherein a depression of said screen on said front side produces an image detectable on said back side;
projecting a first video signal onto said back side of said screen;
detecting said image on said back side of said screen;
determining a location of said depression according to said detected image on said back side of said screen;
receiving data defining a contour of a user on said front side of said screen;
determining an arm length of said user based on said contour; and
determining that said location exists within a range reachable by said arm length.

12. The method of claim 11, wherein said first video signal includes a plurality of items, and further comprising a step of identifying one of said items displayed at said location.

13. The method of claim 12, wherein each said item is linked to a different video signal, and further comprising a step of displaying a second video signal linked to said identified item responsive to said depression.

14. The method of claim 11, further comprising steps of:
determining a time period in which said image is produced;
determining an area of said detected image; and
using said time period and said area to determine an acceleration of said depression.

15. The method of claim 11, wherein said location is determined to be a centroid of said detected image.

16. The method of claim 11, wherein:
a plurality of cameras having an overlapping detection region are provided on said back side of said screen;
said depression occurs within said overlapping detection region; and
said location is determined by mapping data provided via said cameras to a central coordinate system of said screen.

17. The method of claim 11, wherein:
first and second cameras having an overlapping detection region are provided on said back side of said screen;
said depression occurs within said overlapping detection region; and
said location is determined using data provided via said first camera and not using data provided via said second camera.

18. The method of claim 17, wherein a center detection region of said first camera is closer to said location than a center detection region of said second camera.

19. The method of claim 11, wherein a detector is disposed on said back side of said screen, emits infrared light to illuminate said screen, detects infrared content of said screen, and said detecting step is performed by said detector by filtering out video content of said first video signal.

20. A television signal receiver, comprising:
a screen having a front side and a back side, wherein a depression of said screen on said front side produces an image detectable on said back side;
video projecting means, disposed on said back side of said screen, for projecting a first video signal onto said screen;
detecting means on said back side of said screen for detecting said image; and
processing means for determining a location of said depression according to said detected image on said back side of said screen, wherein said processing means receives data defining a contour of a user on said front side of said screen, determines an arm length of said user based on said contour and determines that said location exists within a range reachable by said arm length.

21. The television signal receiver of claim 20, wherein said first video signal includes a plurality of items, and said processing means identifies one of said items displayed at said location.

22. The television signal receiver of claim 21, wherein each said item is linked to a different video signal, and said processing means causes said video projecting means to display a second video signal linked to said identified item.

23. The television signal receiver of claim 20, wherein said processing means further determines a time period and an area of said depression, and uses said determined time period and said determined area to determine an acceleration of said depression.

24. The television signal receiver of claim 20, wherein said processing means determines that said location is a centroid of said detected image.

25. The television signal receiver of claim 20, wherein said detecting means is disposed on the back side of said screen.

26. The television signal receiver of claim 25, wherein:
said detecting means comprises a plurality of cameras having an overlapping detection region on said screen;
said depression occurs within said overlapping detection region; and
said processing means maps data provided via said cameras to a central coordinate system of said screen to determine said location.

27. The television signal receiver of claim 25, wherein:
said detecting means comprises first and second cameras having an overlapping detection region on said screen;
said depression occurs within said overlapping detection region; and
said processing means determines said location using data provided via said first camera and not using data provided via said second camera.

28. The television signal receiver of claim 27, wherein a center detection region of said first camera is closer to said location than a center detection region of said second camera.

29. The television signal receiver of claim 20, wherein said detecting means emits infrared light to illuminate said screen, detects infrared content of said screen, and detects said image by filtering out video content of said first video signal.

* * * * *